(12) United States Patent
Vasa et al.

(10) Patent No.: US 7,925,701 B2
(45) Date of Patent: Apr. 12, 2011

(54) MOBILE COMMUNICATION TERMINAL SUPPORTING INFORMATION SHARING

(75) Inventors: Yojak Vasa, Morrisville, NC (US); David Story, Fuquay-Varina, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1023 days.

(21) Appl. No.: 11/188,320

(22) Filed: Jul. 25, 2005

(65) Prior Publication Data

US 2007/0022158 A1    Jan. 25, 2007

(51) Int. Cl.
*G06F 15/16* (2006.01)
(52) U.S. Cl. .................... 709/205; 709/217; 709/227
(58) Field of Classification Search .......... 709/205, 709/217, 227
See application file for complete search history.

(56) References Cited

U.S. PATENT DOCUMENTS

| 5,819,038 | A | 10/1998 | Carleton et al. | |
| 6,879,997 | B1 * | 4/2005 | Ketola et al. | 709/208 |
| 2003/0045301 | A1 | 3/2003 | Wollrab | |
| 2003/0236820 | A1 * | 12/2003 | Tierney et al. | 709/203 |
| 2005/0091435 | A1 * | 4/2005 | Han et al. | 710/310 |
| 2006/0143620 | A1 * | 6/2006 | Elms et al. | 719/315 |
| 2006/0161516 | A1 * | 7/2006 | Clarke et al. | 707/2 |

FOREIGN PATENT DOCUMENTS

| EP | 1 538 819 | 6/2005 |
| WO | WO 02/089026 | 11/2002 |
| WO | WO 03/043301 | 5/2003 |
| WO | WO 2005/051020 | 6/2005 |

OTHER PUBLICATIONS

PCT International Search Report, International Application No. PCT/US2006/009207, Mailed Jul. 6, 2006.

* cited by examiner

*Primary Examiner* — Hassan Phillips
*Assistant Examiner* — Tanim M Hossain
(74) *Attorney, Agent, or Firm* — Coats & Bennett, P.L.L.C.

(57) ABSTRACT

According to a method of sharing information between mobile terminals, a first mobile terminal receives information, such as a web page, which may include form data, and shares the information with one or more second mobile terminals. Input data relevant to the shared information as entered at the second mobile terminals is returned to the first mobile terminal, which consolidates that data with related input data entered at the first mobile terminal. Consolidated information may be sent from the first mobile terminal to the second mobile terminal(s), so that each of the mobile terminals maintains updated consolidated input data, and this process may be repeated as needed. In at least one embodiment, the information to be shared is provided by a third party information provider, and the first mobile terminal is configured to return the finally consolidated data to the third party information provider.

10 Claims, 3 Drawing Sheets

MOBILE COMMUNICATION TERMINAL SUPPORTING INFORMATION SHARING

BACKGROUND

The present invention relates to mobile terminals, such as cellular radiotelephones and the like, and particularly relates to sharing information between mobile terminals.

As mobile terminals move past voice, fax, and other circuit-switched data applications, and more fully integrate into the evolving packet data networks, their uses expand. These expanding uses raise new communication challenges. For example, mobile terminals give their individual users increasing access to a variety of data-centric information, such as various data objects provided by third parties—movie theater schedules, restaurant menus, online calendars, etc.—but contemporary mobile terminals do not offer any meaningful mechanisms for coordinating the viewing and manipulation of such information between remotely located mobile terminal users.

SUMMARY

One embodiment of information sharing between mobile terminals as taught herein comprises receiving information and sharing that information with a second mobile terminal. The first mobile terminal receives first input data relevant to the information as local input at the first mobile terminal, and receives second input data relevant to the information as remote input from the second mobile terminal. The first mobile terminal consolidates the first and second input data. Information received at the first mobile terminal may originate from a third party information provider and, thus, the first mobile terminal may return the consolidated input data to the third party information provider.

In an aspect of the above method, the first mobile terminal essentially operates as an information server for the second mobile terminal. For example, the first mobile terminal may communicate with a server that provides it with, for example, HyperText Markup Language (HTML) or extensible Markup Language (XML) information, such as a HTML-based or XML-based form. In turn, the first mobile terminal may display the form on a local display screen, and send a copy of the information along to the second mobile terminal for display. Form-related data entries, such as item selections made by a user of the second mobile terminal, etc., are returned from the second mobile terminal to the first mobile terminal, which consolidates such data with locally-entered data, and returns the consolidated data to the server.

Further, in at least one embodiment, the first mobile terminal may send local input data to the second mobile terminal, so that a user of a second mobile terminal remains apprised of selections being made at the first mobile terminal. More generally, the first and second mobile terminals may exchange their local information-related input data, as needed, with each other, until their users finalize their inputs, whereupon one of the two terminals returns consolidated input data to the server.

Additionally, in at least one embodiment, a data connection supports information sharing between the first and second mobile terminals, and the mobile terminals are further configured to support a concurrent voice connection. In this manner, users of the two (or more) mobile terminals engaged in the information sharing session can talk about the shared information and their related selections, for example.

Of course, the present invention is not limited to the above features and advantages. For example, the first mobile terminal may perform information sharing and data consolidation for essentially any number of second mobile terminals, and the mobile terminal(s) may be configured to share information using any number of standards/protocols, such as HTLM, XML, or Session Interface Protocol (SIP). Those skilled in the art will recognize additional features and advantages upon reading the following detailed discussion, and upon viewing the accompanying drawings.

DETAILED DESCRIPTION

Figure 1:
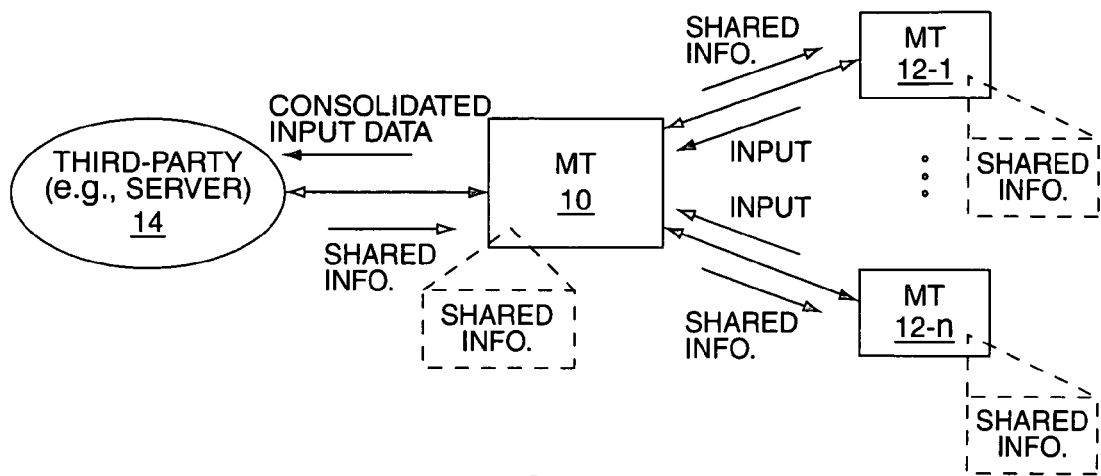
FIG. 1 is a block diagram of a first mobile terminal configured to share information, which may be received from a third party, with one or more second mobile terminals.

FIG. 1 illustrates a first mobile terminal 10 that is configured to share information with one or more second mobile terminals 12, which are specifically illustrated as 12-1 through 12-n, and which are referred to herein generically as mobile terminals 12. In at least one embodiment, the first mobile terminal 10 receives information from a third party 14 (e.g., a network-accessible server associated with a third party information provider), and provides the received information to the mobile terminals 12 as shared information. As will be explained by way of non-limiting examples later herein, the shared information may comprise essentially any type of data, but advantageously may comprise form-type data, such as a restaurant menu or other order form. As such, the information may comprise a HypterText Markup Language (HTML) or eXtensible Markup Language (XML) file.

In a broad embodiment, the first mobile terminal 10 shares information with the second mobile terminals 12, such that all mobile terminals display the same or similar information to their users. Input data locally input at each of the mobile terminals 12 is returned to the mobile terminal 10, where it is consolidated. The mobile terminal 10 can send the consolidated data to the mobile terminals 12, so that their users are apprised of the input data being collected at each of the terminals, and the finally consolidated data can be returned to the third party 14.

As used herein, the term "consolidate" generally connotes joining together the input data from the first mobile terminal 10 and with the input data from the second mobile terminal(s) 12, such as by merging the input data, or otherwise collecting it together. It should be understood that such data consolidation can include any needed data reconciliation, such as where individual related elements of the different input data need to be summed or otherwise aggregated.

Figure 2:
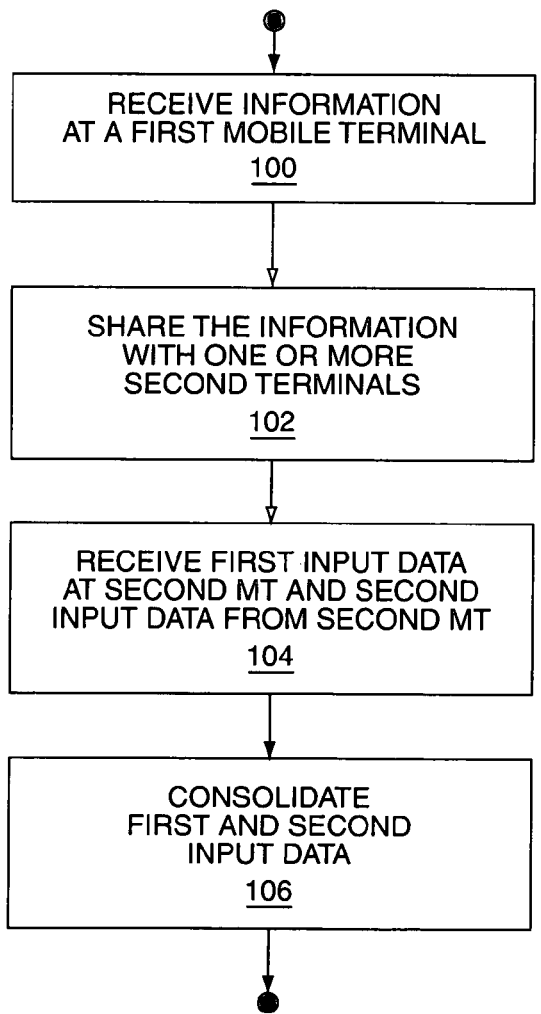
FIG. 2 is a logic flow diagram illustrating one embodiment of information sharing.

With the above points in mind, FIG. 2 illustrates processing logic that is implemented in the mobile terminal 10, according to one embodiment of the information sharing as taught herein. The mobile terminal 10 receives information (Step 100), such as from the third party 14 as shown in FIG. 1. In other embodiments, the mobile terminal 10 may locally generate the information to be shared, rather than receiving it from a third party.

After receiving or generating the information to be shared, the mobile terminal 10 shares the information with the one or more second mobile terminals 12 (Step 102). In at least one embodiment, the mobile terminal 10 shares the information by sending it over a data connection that communicatively couples the mobile terminal 10 with each of the second mobile terminals 12. For example, the mobile terminals 10 and 12 individually or collectively may comprise cellular radiotelephones, Portable Digital Assistants (PDAs), palmtop or laptop computers, pagers, or other types of wireless communication devices supported by one or more wireless communication networks. In at least some embodiments, the mobile terminals 10 and 12 are supported by wireless communication networks providing packet data connections between them.

However connected for information sharing, the mobile terminals 10 and 12 each generally display the shared information, or display data related to the shared information. For example, each mobile terminal 10 and 12 may include web browser software or other application software adapted to display a HTML or XML page on its display screen. Note that the particular information displayed at a given one of the mobile terminals 10 and 12 depends on the terminal's capabilities and/or on its display characteristics (size, resolution, etc.). However, the displayed data generally is related to, or dependent upon, the shared information.

Each mobile terminal 10 and 12 may be expected to receive "local" input data from its user relevant to the shared information. For example, the shared information may comprise a list of items, such that each mobile terminal 10 and 12 displays an item list and accepts touch screen and/or keypad inputs from its user, representing item selections made by the user.

As a more general non-limiting example, the shared data may comprise some type of "form" or page data, such that each mobile terminal 10 and 12 displays form data. As such, each mobile terminal's user may input data related to the displayed form, be it explicit item selections, comments, etc. Such locally input data may be made via each terminal's user interfaces.

Continuing with this example, then, the mobile terminal 10 receives first input data directly from its user—i.e., input through the user interface of the mobile terminal 10—and receives second input data from each of the mobile terminals 12. That second input data represents data locally input by the users of the mobile terminals 12—i.e., input locally through the user interfaces of the mobile terminals 12. Thus, the mobile terminal 10 receives local input data and remote input data, where the remote input data flows to the mobile terminal 10 over the data connection(s) between it and the second mobile terminals 12 (Step 104). In other words, input data received as local input data at each mobile terminal 12 is communicated back to the mobile terminal 10 through one or more supporting communication networks—e.g., one or more wireless communication networks that support the mobile terminals 10 and 12.

The mobile terminal 10 consolidates the first and second input data (Step 106). For example, assuming that all involved mobile terminal users have finished inputting their data—e.g., item selections—the mobile terminal 10 may reconcile the second input data received from the second mobile terminals 12 with the first input data locally input to the first mobile terminal 10. Such reconciliation may include totaling like selections made at the various mobile terminals 10 and 12, or aggregating the different selections made at the various mobile terminals 10 and 12.

In the context of a restaurant menu shared between the first mobile terminal 10 and the second mobile terminals 12, consolidation may comprise reconciling the menu selections made at each mobile terminal (10 or 12), such that an aggregated menu order may be submitted. Thus, as an example, the first mobile terminal 10 may return an aggregated menu order to the third party 14, representing menu selections made by users of the mobile terminals 10 and 12. A server or other network-accessible computer system associated with the restaurant thus acts as the third party 14 in this example.

While those skilled in the art will appreciate that the information shared between the mobile terminals 10 and 12 may comprise essentially any type or types of data, sharing may be advantageous for particular types of information. For example, a method of collecting form data at the first mobile terminal 10 may comprise receiving form data at the first mobile terminal 10 from a server (e.g., the third party 14), sharing the form data with a second mobile terminal 12, updating form-related input data at the first mobile terminal 10 based on form-related input data at the first and second mobile terminals 10 and 12, and returning the form-related input data from the first mobile terminal 10 to the server after updating/consolidation.

Figure 3:
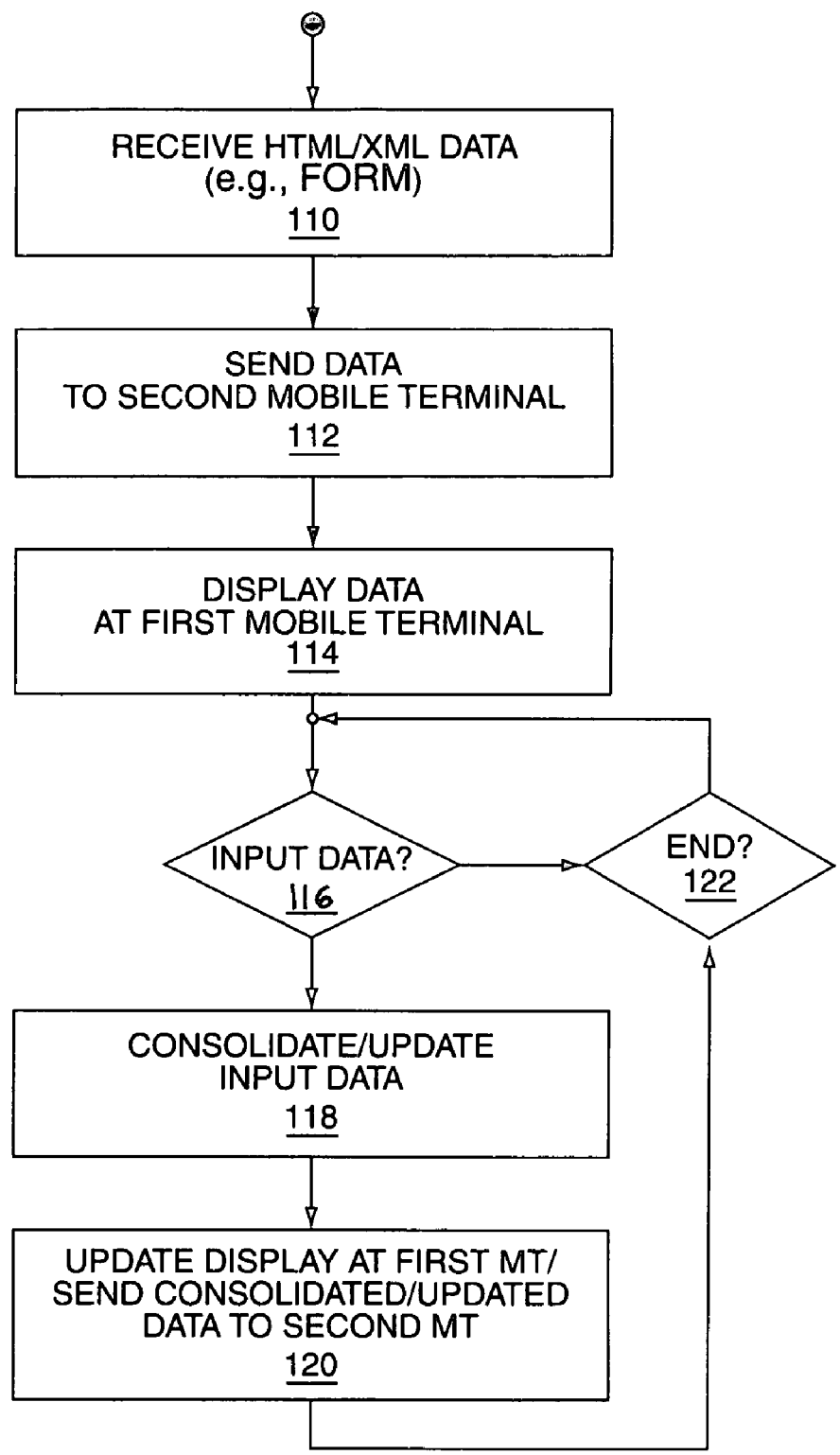
FIG. 3 is a logic flow diagram illustrating details for one embodiment of information sharing.

With the above example in mind, FIG. 3 illustrates an exemplary embodiment of information sharing processing logic based on sharing HTML or XML form data. The illustrated processing logic begins with the mobile terminal 10 receiving HTML and/or XML form data (HTML/XML) (Step 110), such as from a third party 14.

Processing continues with the mobile terminal 10 sending the form data to the mobile terminals 12 (Step 112). Concurrently or subsequently, the mobile terminal 10 displays the form data (Step 114), such as on a display screen included in the mobile terminal 10. (Generally, the mobile terminals 12 also will display the form data on their respective display screens.) In this manner, the users of the mobile terminals 10 and 12 can simultaneously view information corresponding to the same (shared) form data.

While the form data is "open"—i.e., being edited—the mobile terminals 12 send their users' data inputs back to the mobile terminal 10 for consolidation with any inputs made by the user of the mobile terminal 10 (Step 116). Additionally, in at least one embodiment of information sharing as taught herein, the mobile terminal 10 sends its locally input data to the mobile terminal(s) 12, so that their locally displayed information is updated responsive to input data at the mobile terminal 10. With that approach, each user's mobile terminal display reflects changes/selections being made by the other mobile terminal users.

For example, a user of a mobile terminal 12-1 may input data directed to the shared form. The mobile terminal 12-1 would then send the newly input data back to the mobile terminal 10, which would consolidate the newly received input data with the currently existing input data at the mobile terminal 10 (Step 118). In turn, assuming that there are three mobile terminals 12 (12-1, 12-2, and 12-3), the mobile terminal 10 would update its display and send the newly updated consolidated data back to the mobile terminals 12-1, 12-2, and 12-3 (Step 120). These operations would be repeated, as needed, until data inputs were ended (Step 122).

Figure 4:
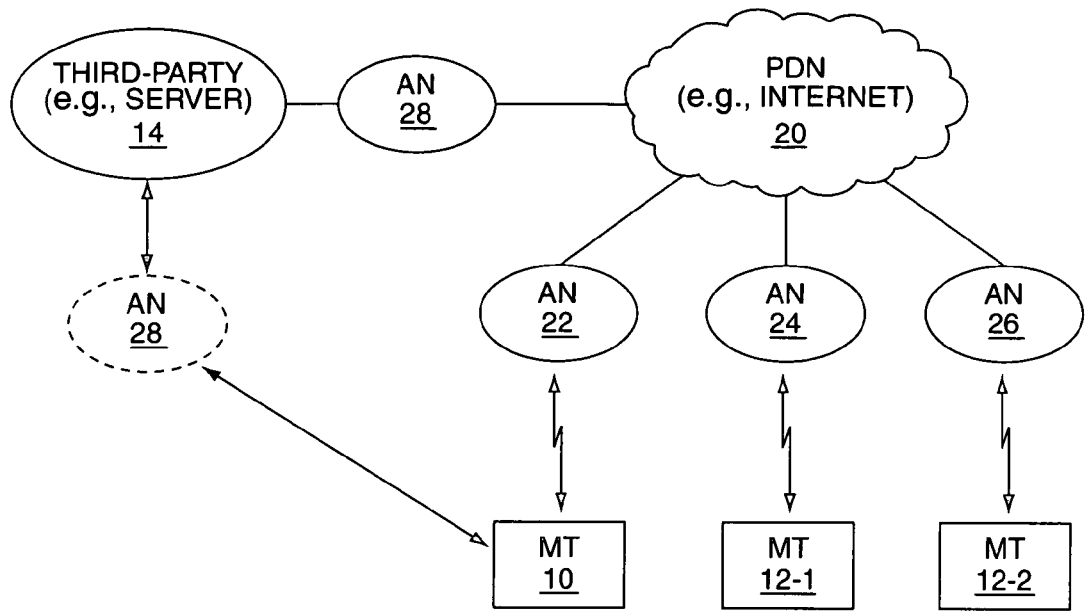
FIG. 4 is a block diagram of access networks and data networks, as may be used to support information sharing.

FIG. 4 illustrates embodiment of networks and related connections that may be configured to support the above processing, or any of the processing variations contemplated herein for information sharing. In the illustrated embodiment, the mobile terminal 10 communicatively couples to a Public Data Network (PDN) 20, such as the Internet, through an Access Network (AN) 22. The AN 22 may comprise a wireless communication network, such as a cellular telephone network, Wireless Local Area Network (WLAN), or other type of network. Similarly, the mobile terminals 12-1 and 12-2 communicatively couple to the PDN 20 through ANs 24 and 26, respectively. Note that the ANs 22, 24, and 26 all may be the same AN, and that, in at least some embodiments, it is immaterial whether the mobile terminals sharing the information access the PDN 20 through the same or different ANs.

Similarly, the third party 14 accesses the PDN 20 through an AN 28. The third party 14 also may access the PDN 20 through one of the ANs used by one or more of the mobile terminals 10 and 12. As a further variation, the mobile terminal 10 may access the third party 14 through a local AN 28, rather than going through the PDN 20. As an example of this option, a user of the mobile terminal 10 may enter a restaurant or other establishment having a short-range transceiver, such as a Bluetooth or WiFi transceiver. The mobile terminal 10 thus may download the information to be shared through that local AN, and then distribute it to the mobile terminals 12 via a cellular network connection, or other wider-area communication link.

Figure 5:
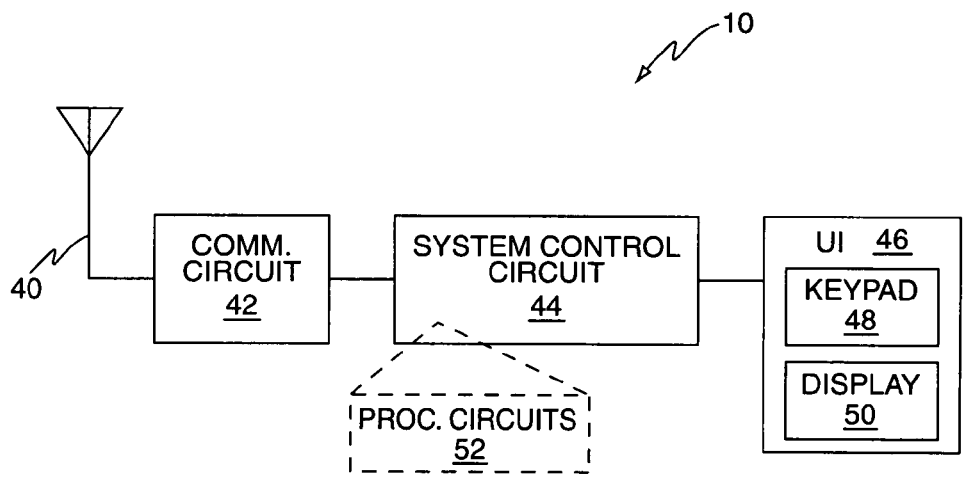
FIG. 5 is a block diagram of a mobile terminal configured to support information sharing.

In support of such operations, FIG. 5 illustrates the configuration of the mobile terminal 10 in one embodiment. As illustrated, the mobile terminal 10 comprises one or more transmit/receive antennas 40, a communication circuit 42, which may include cellular and short-range transceiver circuits, a system control circuit 44, a user interface 46, which may include a keypad 48 and a display screen 50.

Of particular interest with respect to information sharing, the system control circuit 44 may include one or more processing circuits 52 configured to receive information and share the information with a second mobile terminal 12, receive first input data relevant to the information as local input at the mobile terminal 10, receive second input data relevant to the information as remote input from the second mobile terminal 12, and consolidate the first and second input data at the first mobile terminal 10.

Of course, those skilled in the art will appreciate that the system control circuit 44 may comprise one or more special- or general-purpose microprocessors, or may comprise one or more other types of digital processing circuits, such as Application Specific Integrated Circuits (ASICs), Field Programmable Gate Arrays (FPGAs), Complex Programmable Logic Devices (CPLDs), etc. In any case, it will be appreciated that the one or more processing circuits 52 may be implemented at least in part via software as "functional" circuits configured to carry out information sharing. As such, the one or more processing circuits 52 may include or be associated with memory storing computer program instructions for carrying out information sharing as taught herein.

Regardless of these implementation details, the mobile terminal 10 of FIG. 5 may be configured to provide information sharing for one or more second mobile terminals 12. As noted, the mobile terminal 10 may receive the information to be shared from a third party information provider (e.g., third party 14), and may return consolidated input data related to the shared information to that third party information provider. The information to be shared may be received directly or indirectly from the third party information provider, and the mobile terminal 10 may share the information with essentially any number of second mobile terminals 12.

For example, where the information to be shared comprises form data, the mobile terminal 10 sends the form data to the second mobile terminals 12. With this approach, information related to the shared form data is displayed at the mobile terminal 10 and at the mobile terminals 12, and the mobile terminal 10 receives first form selection input data by its user and receives second form selection input data by the user(s) of the second mobile terminal(s) 12. The second form selection input data may be received via one or more data connections—e.g., over a cellular communication link, such as a packet data link, supported by the communication circuit 42 of the mobile terminal 10.

The mobile terminal 10 consolidates the first and second input data, such as by reconciling it. Note that, in at least one embodiment, the first mobile terminal 10 consolidates the input data and shares the information with the second mobile terminals 12 by acting as a HyperText Transport Protocol (HTTP) server for the second mobile terminals 12, at least with respect to the form data received from the third party information provider at the first mobile terminal 10.

Those skilled in the art will appreciate that some or all of the above information sharing and data consolidation may be performed using a variety of protocols, including standard and proprietary protocols. For example, in addition to the use of HTML and/or XML based exchanges, or as an alternative to such exchanges, the first mobile terminal 10 and the second mobile terminal(s) may share information and exchange updated or consolidated data through the use of SIP-based signaling.

However, regardless of the format in which the information to be shared is received at the first mobile terminal 10 and transferred to the second mobile terminals 12, and regardless of the format in which the input data at the mobile terminals 10 and 12 is exchanged and consolidated, the mobile terminals 10 and 12 may be configured to support voice connections concurrent with their information sharing. In more detail, the first mobile terminal 10 is configured to maintain a voice channel to support voice communication with a second mobile terminal 12 concurrently with maintaining a data connection with that second mobile terminal 12, to support sharing the information with the second mobile terminal 12 while users of the first and second mobile terminals converse.

Further, it should be noted that the second mobile terminals 12 may be configured similarly to the first mobile terminal 10. That is, the first mobile terminal 10 may be configured to send locally input data from the first mobile terminal 10 to the second mobile terminals 12, such that they also can consolidate that input data with their own locally input data.

Of course, those skilled in the art will appreciate that the present invention is not limited to the features and advantages detailed in the foregoing description, nor is it limited by the accompanying drawings. Indeed, the present invention is limited only by the following claims, and their legal equivalents.

What is claimed is:

1. A method of sharing information between mobile terminals comprising:
  receiving form data at a first mobile terminal, wherein the form data is received directly or indirectly from a third party information provider;
  sending the form data from the first mobile terminal to a second mobile terminal;
  receiving first form selection input data relevant to the form data as local input by a user at the first mobile terminal, and receiving second form selection input data relevant to the form data as remote input from the second mobile terminal by a user of the second mobile terminal;
  consolidating the first and second form selection input data at the first mobile terminal;
  sending the consolidated form selection input data from the first mobile terminal to a third party server; and
  maintaining a voice channel to support voice communication with the second mobile terminal concurrently with maintaining a data connection with the second mobile terminal to support sharing the form data with the second mobile terminal;

wherein sending the form data from the first mobile terminal to a second mobile terminal, receiving the second form selection input data from the second mobile terminal, and consolidating the first and second form selection input data comprises the first mobile terminal acting as a server for the second mobile terminal, at least with respect to the form data received from the third party information provider at the first mobile terminal.

2. The method of claim 1, wherein consolidating the first and second form selection input data comprises reconciling the first and second form selection input data.

3. The method of claim 1, wherein the first mobile terminal acts as a HyperText Transport Protocol (HTTP) server for the second mobile terminal, at least with respect to the form data received from the third party information provider at the first mobile terminal.

4. The method of claim 1, wherein receiving the form data at the first mobile terminal comprises receiving HyperText Markup Language (HTML) information or eXtensible Markup Language (XML) information.

5. The method of claim 4, wherein sending the form data from the first mobile terminal to the second mobile terminal comprises sending the HTML or XML information to the second mobile terminal.

6. The method of claim 1, wherein at least one of receiving the form data at the first mobile terminal, sending the form data from the first mobile terminal to the second mobile terminal, and receiving the second form selection input data from the second mobile terminal comprises a Session Initiation Protocol (SIP) based exchange.

7. The method of claim 1, further comprising maintaining a voice connection at the first mobile terminal for the second mobile terminal, concurrently with sending the form data from the first mobile terminal to the second mobile terminal.

8. The method of claim 1, further comprising sending the first form selection input data from the first mobile terminal to the second mobile terminal, such that the second mobile also can consolidate the first and second form selection input data.

9. A first mobile terminal comprising one or more processing circuits configured to:
   receive form data directly or indirectly from a third party server and share the form data with a second mobile terminal;
   receive first form selection input data relevant to the form data as local input by a user at the first mobile terminal, and receive second form selection input data relevant to the form data as remote input from the second mobile terminal;
   consolidate the first and second form selection input data at the first mobile terminal;
   send the consolidated form selection input data from the first mobile terminal to the third party server; and
   maintain a voice channel to support voice communication with the second mobile terminal concurrently with maintaining a data connection with the second mobile terminal to support sharing the form data with the second mobile terminal;

wherein the processing circuits are configured so that the first mobile terminal acts as a server for the second mobile terminal in sharing the form data with the second mobile terminal, receiving the second form selection input data from the second mobile terminal, and consolidating the first and second form selection input data, at least with respect to the form data received from the third party information provider at the first mobile terminal.

10. A method of collecting form data at a first mobile terminal comprising:
   receiving form data at the first mobile terminal from a server;
   sharing the form data with a second mobile terminal;
   updating form-related input data at the first mobile terminal based on form-related input data at the first and second mobile terminals;
   returning the updated form-related input data from the first mobile terminal to the server; and
   maintaining a voice channel to support voice communication with the second mobile terminal concurrently with maintaining a data connection with the second mobile terminal to support sharing the form data with the second mobile terminal;

wherein sharing the form data with the second mobile terminal and updating form-related input data at the first mobile terminal comprises the first mobile terminal acting as a server for the second mobile terminal, at least with respect to the form data received from the server at the first mobile terminal.

* * * * *